US007268815B1

(12) United States Patent
Meynants (10) Patent No.: US 7,268,815 B1
(45) Date of Patent: Sep. 11, 2007

(54) DIFFERENTIAL READOUT OF A PIXEL ARRAY WITH ELIMINATION OF PIXEL- AND COLUMN-WISE FIXED PATTERN NOISE

(75) Inventor: Guy Meynants, Mechelen (BE)

(73) Assignee: Cypress Semiconductor Corporation (Belgium) BVBA, Mechelen (BE)

( * ) Notice: Subject to any disclaimer, the term of this patent is extended or adjusted under 35 U.S.C. 154(b) by 905 days.

(21) Appl. No.: 09/684,611

(22) Filed: Oct. 6, 2000

(51) Int. Cl.
*H04N 5/335* (2006.01)
(52) U.S. Cl. .................................. 348/294; 348/302
(58) Field of Classification Search ................ 348/341
See application file for complete search history.

(56) References Cited

U.S. PATENT DOCUMENTS

| | | | |
|---|---|---|---|
| 5,321,528 A | 6/1994 | Nakamura | |
| 5,841,126 A | 11/1998 | Fossum et al. | |
| 6,021,172 A | 2/2000 | Fossum | |

FOREIGN PATENT DOCUMENTS

| | | | |
|---|---|---|---|
| EP | 0260954 A | | 3/1988 |
| EP | 0481373 A | | 4/1992 |
| EP | 0773669 A | | 5/1997 |
| WO | WO99/16238 | * | 4/1999 |

| | | | |
|---|---|---|---|
| WO | WO 99/16238 | | 4/1999 |

OTHER PUBLICATIONS

Martin W.J. et al. "Dynamic Offset Null", IBM Technical Disclosure Bulletin, vol. 23, No. 9, Feb. 1981, p. 4195/4196 XP002052268.

* cited by examiner

*Primary Examiner*—John Miller
*Assistant Examiner*—Heather R. Jones
(74) *Attorney, Agent, or Firm*—Blakely, Sokoloff, Taylor & Zafman LLP (57) ABSTRACT

The present invention discloses an amplifying circuit, comprising an amplifying element with at least an input terminal and an output terminal. A signal input node is provided, the signal levels of which at least two moments in time are to be amplified by the amplifying element. At least two connecting lines are provided between the signal input node and the amplifying element, for transferring a signal from the signal input node to the input terminal of the amplifying element. A memory element is located on at least one of the connecting lines, for storing a signal level of the signal input node at a moment in time, and a switching element is disposed on each connecting line, between the memory element and the input terminal of the amplifying element if a memory element is provided on the connecting line, for consecutively connecting signal levels of the signal input node at different moments in time to the same amplifying element. The amplifying circuit has at least one output node, each output node being connected to the output terminal of the same amplifying element.

20 Claims, 10 Drawing Sheets

DIFFERENTIAL READOUT OF A PIXEL ARRAY WITH ELIMINATION OF PIXEL- AND COLUMN-WISE FIXED PATTERN NOISE

BACKGROUND OF THE INVENTION

1. Field of the Invention

The present invention relates to solid state imaging devices being manufactured in a CMOS- or MOS-technology. More particularly, an amplifying circuit and a method for eliminating fixed pattern noise in the output signal of a pixel or of an image sensor are disclosed.

2. Technical Background

Solid state image sensors are well known. Commonly solid state image sensors are implemented in a CCD-technology or in a CMOS- or MOS-technology. Solid state image sensors find a widespread use in camera systems. A matrix of pixels comprising light sensitive elements constitutes an image sensor, which is mounted in the camera system. The signal of said matrix is measured and multiplexed to a so-called video signal.

CCD-based camera systems have less noise fluctuations in the image compared to CMOS- or MOS-based camera systems. Therefore CCD-based camera systems are nowadays preferred in applications wherein a high image quality is required such as video or still camera applications. Due to the further miniaturization of the CMOS electronics technology, it is possible to realize complex CMOS- or MOS-based pixels as small as CCD-based pixels. It is a further advantage of CMOS- or MOS-based pixels that CMOS is a technology being offered by most foundries whereas CCD-technology is rarely offered and is a more complex and expensive one.

Of the image sensors implemented in a CMOS- or MOS-technology, CMOS or MOS image sensor with passive pixels and CMOS or MOS image sensors with active pixels are distinguished. An active pixel is configured with means integrated in the pixel to amplify the charge that is collected on the light sensitive element. Passive pixels do not have said means and require a charge-sensitive amplifier that is not integrated in the pixel and is connected with a long line towards the pixel. For this reason, active pixel image sensors are potentially less sensitive to noise fluctuations than passive pixels. Due to the additional electronics in the active pixel, an active pixel image sensor may be equipped to execute more sophisticated functions, which can be advantageous for the performance of the camera system. Said functions can include filtering, operation at higher speed or operation in more extreme illumination conditions. It remains however a main drawback of active pixel CMOS or MOS image sensors, hampering their use in applications requiring a high image quality, that their output signal has an additional non-uniformity caused by the statistical spread of the characteristics of the electronic components composing the active pixel. An example of such characteristic being subject to manufacturing process variations is the threshold voltage of MOS transistors, integrated in the pixel. If no precautions are taken, this non-uniformity, called fixed pattern noise or FPN, is seen as a "snow-like" overlay over an image taken with a CMOS or MOS image sensor with active pixels.

Several solutions have been proposed to solve this problem. They are all based on a 'double sampling' technique, this means that the pixel is read out twice. The first readout refers to the pixel output level in the dark, and the other readout refers to the pixel output level after illumination. The prior readout will be called R and the latter readout will be called S in this text. Both the R and S signals are influenced in the same way by offset variations in the components of the pixel. By consequence, the difference between both signals is free of pixel offset variations.

Very often, the pixel readout that refers to the dark pixel output is the readout of a pixel that has been 'reset'. This means that the pixel has been put into a known state that is equivalent to the situation where no light falls in on the pixel. The pixel signal after illumination is usually obtained after waiting a time period, called integration time, during which charges are collected that are generated by the light. However, there are also other approaches.

Figure 9:
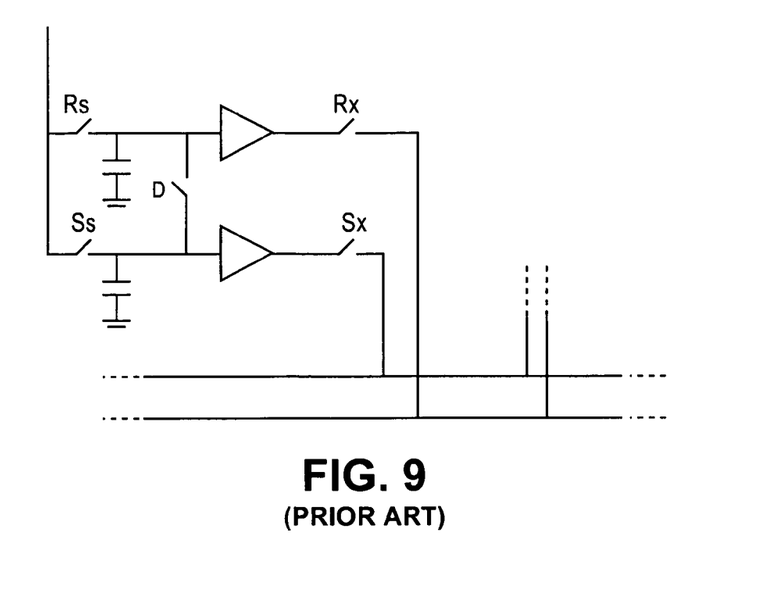
FIG. 9 shows a prior art amplifying circuit without offset correction of the column amplifiers.

One possible implementation of the double sampling method is shown in FIG. 9. The S signal and the R signal are both sampled on a capacitor at the appropriate moment in time when the pixel delivers these signals. Usually, this occurs right after the selection of a new row in the imager. This method suppresses the offset variations of the pixels completely. There is however a problem with column-level offset variations. Because both the R and the S signals have a different signal path, they will be influenced differently by offset variations of the amplifying elements in the columns. Offset variations of the 2 amplifiers in each column add to the differential signal and cause fixed pattern noise.

Figure 10:
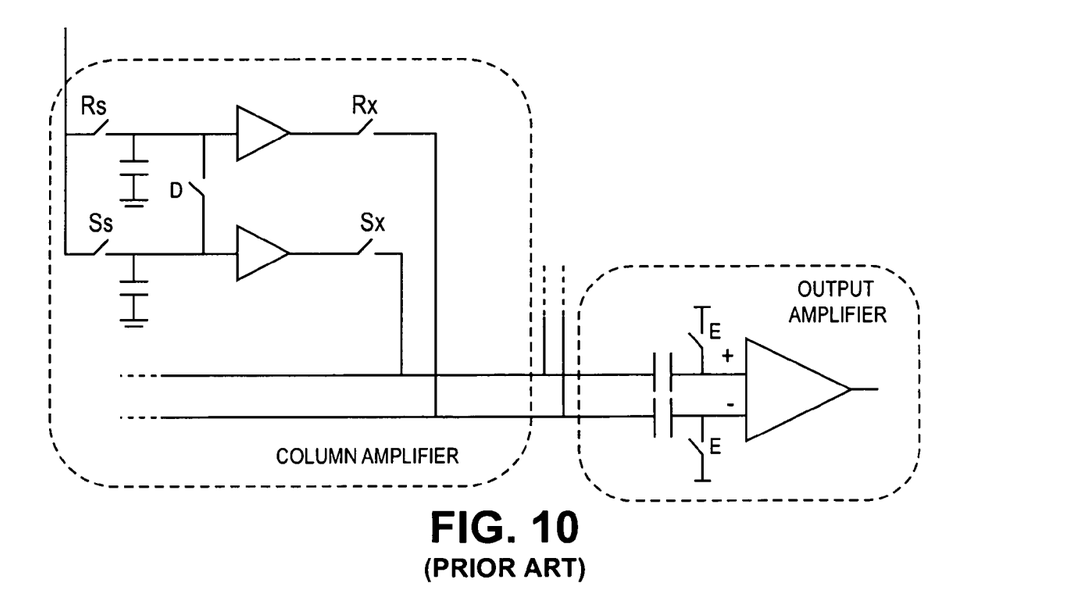
FIG. 10 shows a prior art amplifying circuit

U.S. Pat. No. 5,841,126 (Fossum et al.) proposes a solution to this problem. On every pixel readout, there is an extra step for offset compensation of the column amplifiers. FIG. 10 shows a generalized schematic of this principle. In the actual description of the referred patent, the amplifiers are PMOS source followers. Compared to FIG. 9, there is an additional switch 'D' at the input of the 2 column amplifiers. This switch can connect the 2 inputs of the amplifiers together. Additional switches 'E' are used to connect the output amplifier inputs to a known reference voltage and there are 2 additional series-connected capacitors between the inputs of the output amplifier and the readout busses. To compensate the offset variations between the 2 column amplifiers, the device is read out in 2 phases. First, switches 'E' are closed while the R and S signals are put on the reset and signal readout busses. The R and S signals appear across the series capacitors at the output amplifier. Then, switches 'E' are opened and 'D' is closed. Because switches 'E' are open, the voltage across the capacitors cannot change any more. But because 'D' is closed, the inputs of the two amplifiers are the same. The offset levels of the output amplifiers are put on the differential readout bus. Across the capacitors is the R and S signal, including the offset level of both amplifiers, but with an inverse polarization. On the other side of the capacitors, the R and S signals appear, without the amplifier offsets. The offset levels and the difference in these levels of the two amplifiers are in this way subtracted from the differential signal at the output. The disadvantage of this method is a doubled multiplexing speed, which compromises the maximal obtainable pixel rate. The column amplifiers must be designed twice as fast as in a normal multiplexer.

European patent EP 0 773 669 B1 (B. Dierickx) proposes a solution based on one single amplifier with an additional control input to compensate the non-uniformity of the pixels and of the amplifier itself. A single-ended readout bus is used. This approach does offer a faster readout, because only the pixel signal needs to be multiplexed to the output. The entire pixel readout period is available for multiplexing this signal. However, this approach suffers from a little residual FPN that is caused by a non-complete suppression of threshold voltage variations of one particular transistor of the column amplifier.

SUMMARY OF THE INVENTION

The present invention provides an amplifying circuit comprising:

an amplifying element with at least an input terminal and an output terminal, a signal input node, the signal levels of which at least two moments in time are to be amplified by the amplifying element, at least two connecting lines between the signal input node and the amplifying element, for transferring a signal from the signal input node to the input terminal of the amplifying element, a memory element on at least one of the connecting lines, for storing a signal level of the signal input node at a moment in time, a switching element disposed on each connecting line, between the memory element and the input terminal of the amplifying element if a memory element is provided on the connecting line, for consecutively connecting signal levels of the signal input node at different moments in time to the same amplifying element, at least one output node, each output node being connected to the output terminal of the same amplifying element.

The present invention also provides a device for imaging applications, comprising a matrix of active pixels arranged in a geometric configuration, each pixel producing an electrical signal indicative of the light intensity of a portion of a scene being imaged by that pixel, at least one amplifying circuit common to a group of pixels out of the matrix at least one output line wherein each amplifying circuit comprises an amplifying element with at least an input terminal and an output terminal, a signal input node being intended to obtain electrical signals from pixels out of the group of pixels to which the amplifying circuit is common, the signal levels of which are to be amplified by the amplifying element, at least two connecting lines between the signal input node and the amplifying element, for transferring an electrical signal from the signal input node to the input terminal of the amplifying element, a memory element on at least one of the connecting lines, for storing a signal level of the electrical signal at the signal input node at a moment in time, a switching element disposed on each connecting line, between the memory element and the input terminal of the amplifying element if a memory element is provided on the connecting line, for consecutively connecting signal levels of the electrical signals at the signal input node at different moments in time to the same amplifying element, at least one output node, each output node being connected to the output terminal of the same amplifying element.

The present invention also provides a pixel adapted for integration in an imaging device, comprising:

a radiation sensitive element able to produce an electrical signal indicative of the amount of radiation picked up by that pixel, an amplifying circuit wherein the amplifying circuit comprises an amplifying element with at least an input terminal and an output terminal, a signal input node, the signal levels of which at least two moments in time are to be amplified by the amplifying element, the signal levels being obtained from the radiation sensitive element, at least two connecting lines between the signal input node and the amplifying element, for transferring a signal from the signal input node to the input terminal of the amplifying element, a memory element on at least one of the connecting lines, for storing a signal level of the signal input node at a moment in time, a switching element disposed on each connecting line, between the memory element and the input terminal of the amplifying element if a memory element is provided on the connecting line, for consecutively connecting signal levels of the signal input node at different moments in time to the same amplifying element, at least one output node, each output node being connected to the output terminal of the same amplifying element.

The present invention also provides a method for reducing fixed pattern noise of solid state imaging device having a group of active pixels, each pixel comprising a radiation sensitive element and an amplifying circuit, the method comprising the following steps:

reading out the signal of a pixel brought in a first state and storing the corresponding voltage level in a first memory element reading out the signal of the pixel brought in a second state (which is different from the first state) and storing the corresponding voltage level in a second memory element transferring the signal of the first memory element to an amplifying element, amplifying it and transferring it to an output line transferring the signal of the second memory element to the same amplifying element, amplifying it and transferring it to an output line repeating these steps for at least part of the pixels of the imaging device The present invention also includes a method for reducing fixed pattern noise and kTC noise in a solid state imaging device having a group of active pixels, each pixel comprising a radiation sensitive element and an amplifying circuit, said method comprising the following steps:

reading out the signal of a pixel in a first state, corresponding to the non-illuminated or dark condition of said pixel or to the rest state of said pixel, and storing the corresponding voltage level alternatingly on a first or a third memory element reading out the signal of the pixel in a second state, at a later moment in time, corresponding to an amount of radiation or light collected on the radiation sensitive element of said pixel, and storing the corresponding voltage level on a second memory element alternatingly transferring the signal of the first or the third memory element to an amplifying element, amplifying it and transferring it to an output line that is common to said group of pixels transferring the signal of the second memory element to the same amplifying element, amplifying it and transferring it to an output line that is common to said group of pixels repeating this operation for essentially all or part of the pixels of the imaging device.

The present invention discloses a device such as an image sensor which permits reduction of fixed pattern noise (FPN) which is invariant in time, without introducing noise of other origin. The device comprises a matrix of active pixels as well as electronic components or circuits located by preference at the edges or border of the matrix of pixels. At the expense of forming an image sensor with an unusual large area, said electronic components or circuits can also be integrated in said pixels. Said electronic components or circuits comprise at least one amplifying circuit which is common to a group of pixels such as a column or row in said matrix. Furthermore, said device has at least one output line that is preferably common to said matrix. The amplifying circuit comprises a signal input node, an amplifying element, at least one memory element and at least one output node. Each output node of this circuit can be connected consecutively to its corresponding memory element through said amplifying element.

The active pixels are adapted for being brought in a state corresponding to an amount of radiation collected on said pixel, and can therefore be changed into a first state. It is required that this first state can be compared to a second state that is different. Said first state can correspond to an amount of collected radiation or light on the radiation or light sensitive element in said pixel. Said first state can also correspond to the reset state of the pixels or to a non-illuminated or dark condition of the pixel. Said second state can correspond to a non-illuminated or dark condition of the pixel, or to an amount of collected radiation or light on the radiation or light sensitive element in said pixel, or to the reset state of said pixel.

Preferably, the amplifying element is a transistor and more particularly of the type of metal oxide semiconductor transistors. It can also be a more complex amplifier in its own. Each memory element is preferably a capacitor. Preferably, at least two memory elements are used.

In a first aspect of the present invention, an amplifying circuit is disclosed comprising a signal input node, an amplifying element, at least two memory elements and at least two output nodes, each being connected consecutively to its corresponding memory element through said amplifying element.

In a second aspect of the present invention, a device for imaging applications comprising said amplifying circuit and comprising a group of pixels is disclosed.

In a third aspect of the present invention, a pixel is disclosed, adapted for integration in an imaging device, comprising an amplifying circuit with an amplifying element and a memory element as well as connections and circuits to adjust the signal in an output terminal of said amplifying element to a known level, a measure of the corresponding level in a control terminal of said amplifying element being stored on said memory element. Said pixel has preferably a photo sensitive element such as a photodiode or an infrared photo detector.

In a fourth aspect of the present invention, a method is disclosed for eliminating fixed pattern noise, which is invariant in time, in the output signal of an image sensor making use of said device. The method is as follows: the readout output signal of essentially each pixel in said image sensor when in a first state, is stored in one memory element. The readout output signal of each pixel in said image sensor when in a second state is stored on another memory element. The signals of the memory elements are transferred to one or more common output lines through the amplifying element. By preference, the memory elements each use one column output line. The memory elements are to be read out consecutively through the same amplifying element. Offset variations between the amplifying elements appear as common-mode signals on the output lines. The difference between both output lines, also called the differential output signal, is changing essentially only due to the difference in the amount of light or radiation collected on the light or radiation sensitive element of the pixel between both states. Said differential output signal, therefore, does not include fixed pattern noise of pixels nor fixed pattern noise of the amplifier or amplifying element itself.

In a fifth aspect of the present invention, the use is disclosed of said imaging device and said method in camera systems and in imaging applications requiring a high image quality. An example of such camera system is a video or still camera or a camera integrated in a multimedia device such as a Personal Computer equipped with video functionality or with video and speech functionality. The imaging device of the present invention is configured as a pixel matrix that is used as a focal plane image sensor. As is well understood by a technologist in the relevant field, for this purpose the integrated circuit containing the pixel matrix and the peripheral circuits are packaged and mounted inside a camera housing with a lens, at the same place where a photographic film would be located.

The present invention will now be described with reference to the following drawings.

DETAILED DESCRIPTION OF PREFERRED EMBODIMENTS

The present invention will be described with reference to certain embodiments and to certain drawings but the invention is only limited by the claims.

Embodiments of the present invention permit to reduce fixed pattern noise (FPN) in image sensors. Like other techniques, this invention uses a 'double sampling' technique, this means that the pixel is read out twice. One readout refers to the pixel output level in the dark, and the other readout refers to the pixel output after illumination. The prior readout will be called R and the latter readout will be called S in this text. Both the R and the S signal are influenced in the same way by offset variations in the components of the pixel. By consequence, the difference between both signals is free of pixel offset variations.

Figure 1:
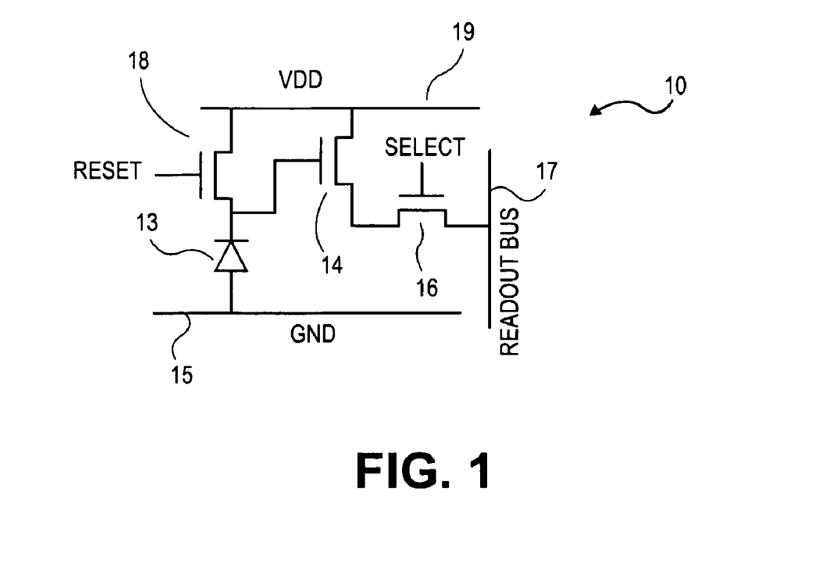
FIG. 1 shows an example of an active pixel containing three transistors and a photodiode that can be used in the present invention.

A pixel 10 suitable for use with the present invention is shown in FIG. 1. It comprises a radiation sensitive element 13 and an amplifying circuit 14. The radiation sensitive element 13 may be a photoreceptor which yields current or charge depending upon the incident light intensity. Such a radiation sensitive element 13 may be a photodiode, a photo bipolar junction transistor, a photo-gate or similar. The amplifying circuit 14 may comprise a transistor, for example such as a bipolar transistor but more preferably an MOS transistor such as a MOSFET transistor or may comprise several such transistors forming an amplifier or any other sort of amplifier. As shown, the gate of the amplifying transistor is connected to one output of the radiation sensitive element 13. One main electrode of the amplifying transistor is connected to a voltage source line 19. By main electrode is to be understood one of source or drain. The pixel 10 also comprises a selection device 16 with which the output of each pixel 10 may be connected to a readout bus 17. The selection device 16 may be a switching element. The selecting device 16 may be a transistor such as a bipolar transistor or a MOSFET transistor or similar. The other main electrode of the amplifying transistor is connected to one main electrode of the selecting transistor. The other main electrode of the selecting transistor is connected to the readout bus 17. The gate of the selecting transistor is connected to a selecting bus. Lines 19 and 15 provide voltage sources to drive the circuit elements 14, 16. The radiation sensitive element 13 is connected between the voltage source lines 19, 15 such that a change of resistance of the radiation sensitive device (caused by incident light intensity) changes the current flowing through it. In addition a reset device 18 is provided for resetting the pixel between selections by the selection device 16. The reset device 18 may be placed in series with the radiation sensitive device 13. The reset device 18 may be a switching element. The switching element may be a transistor such as a bipolar transistor but is more preferably and MOS transistor such as a MOSFET transistor. One main electrode of the reset transistor is connected to one of the voltage source lines 19. The other main electrode is connected to the radiation sensitive element 13. The gate of the reset transistor is connected to a reset bus.

Pixels are assembled in a geometrical array, for example in rows and columns. The complete array is preferably made on one chip. Preferably, the pixel array and all readout electronics is fabricated on one chip. The present invention uses one single amplifier in each column to transfer both the R and S signal to the common output line. Where column is referred to in this text it is understood that the array could be rotated through 90° so that columns become rows and vice versa without a functional alteration. Offset variations between amplifiers 29 of different columns appear as a common-mode signal on the differential readout bus 32, 34. The differential signal on this bus is thus free of offset variations of the column amplifiers and of the pixels.

Figure 2:
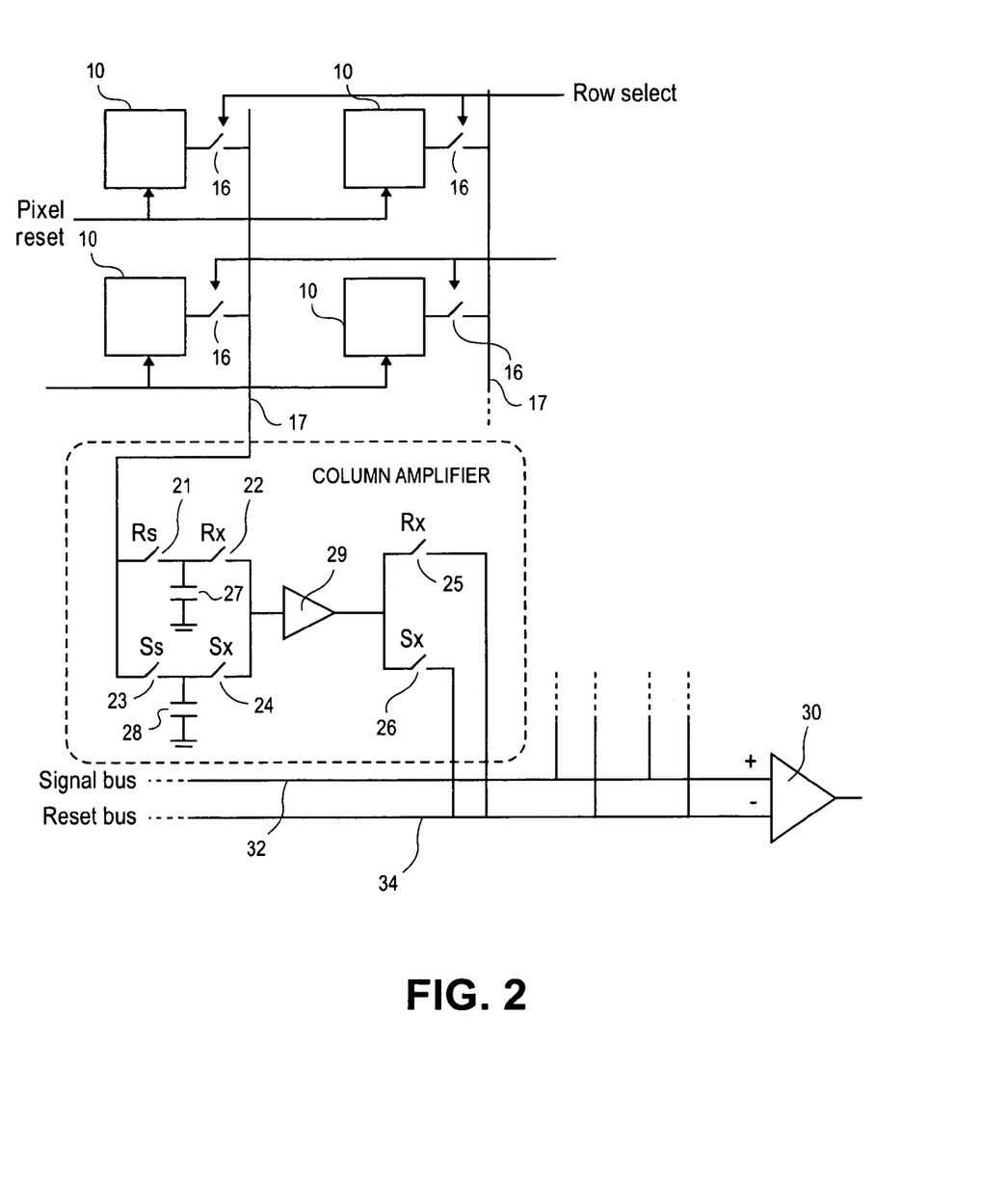
FIG. 2 shows an embodiment of the device for imaging applications according to the present invention.

FIG. 2 shows an embodiment of this circuit, illustrated with a 2×2 pixel array of pixels 10 as shown in FIG. 1. A column amplifier 20 contains 6 switches 21-26, 2 capacitors 27, 28 and an amplifying element 29. The two outputs of the column amplifier 20 are connected to two buses 32, 34 which are connected to an amplifier 30. 2 switches 21, 23 and 2 capacitors 27, 28 are used to sample the S and R signals that are generated by the relevant pixel 10. Usually, this happens just after a new pixel row has been accessed on the pixel array.

Figure 3:
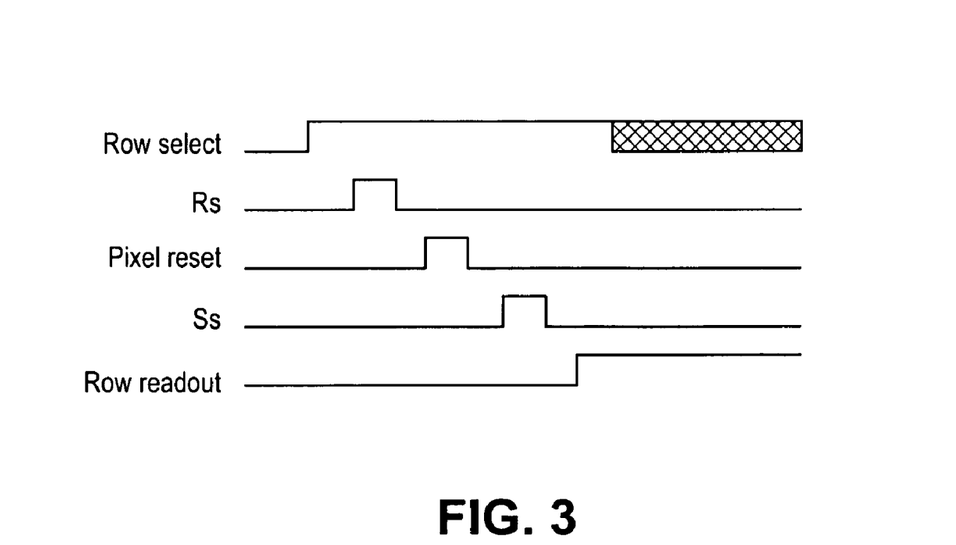
FIG. 3 schematically shows the part of the timing diagram of the method for eliminating fixed pattern noise in a solid state imaging device according to the present invention that considers the pulses to be given after selection of a new row.

FIG. 3 shows a typical timing diagram for this operation. After the new pixel row has been accessed, the R or the S signal appears at the pixel output. This signal is sampled on the capacitor 27 or 28 by closing the appropriate switch 21 or 23 (Rs or Ss). Then, the pixels are switched so that they output the alternate signal (S or R). This signal is sampled on the other of the two capacitors 28 or 27 by closing the appropriate switch 23 or 21 (Ss or Rs). At this moment, all information of the row is stored on the 2 capacitors 27, 28 of the column amplifier 20 and the readout of the pixels of that row can start.

Figure 4:
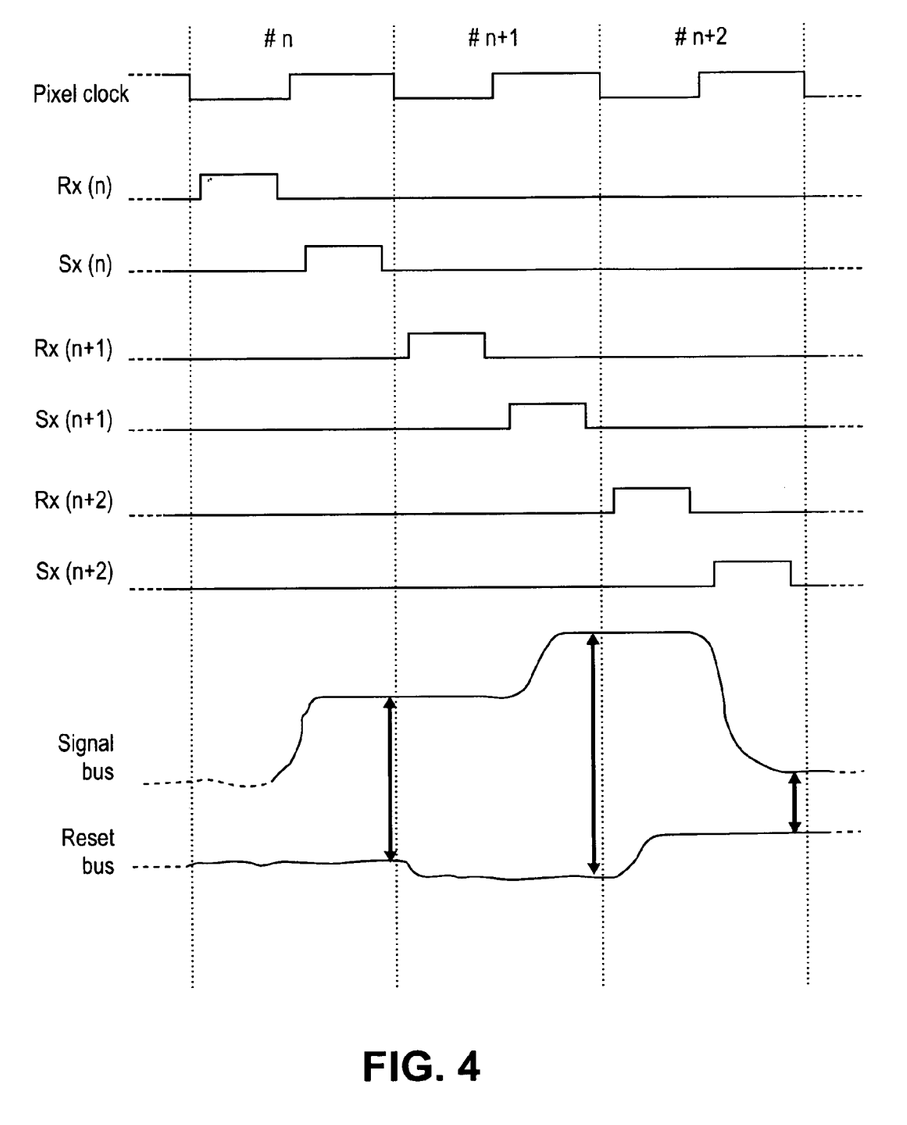
FIG. 4 schematically shows a possible column readout timing diagram and signal levels on the common output lines, wherein each of these signals must be stable within one half of the pixel period.

FIG. 4 shows a possible timing diagram, containing the timing pulses and the waveforms on the readout bus during the readout of a row. It is illustrated for 3 successive pixels, n, n+1 and n+2. A particular column is selected by the Rx and Sx switches 22, 24. These switches 22, 24 connect the signal of one of the capacitors 27, 28 of the column to the input of the amplifier 29. The amplifier 29 puts this signal on the appropriate readout bus 32, 34 via the appropriate switch 25, 26. After both signals on the R and S capacitors 27, 28 have been transferred to their respective readout busses 32, 34, the differential signal on the readout bus 32, 34 is proportional to the pixel signal of that column. This signal is free of offset variations of both the pixel 10 and the column amplifier 20.

Figure 11:
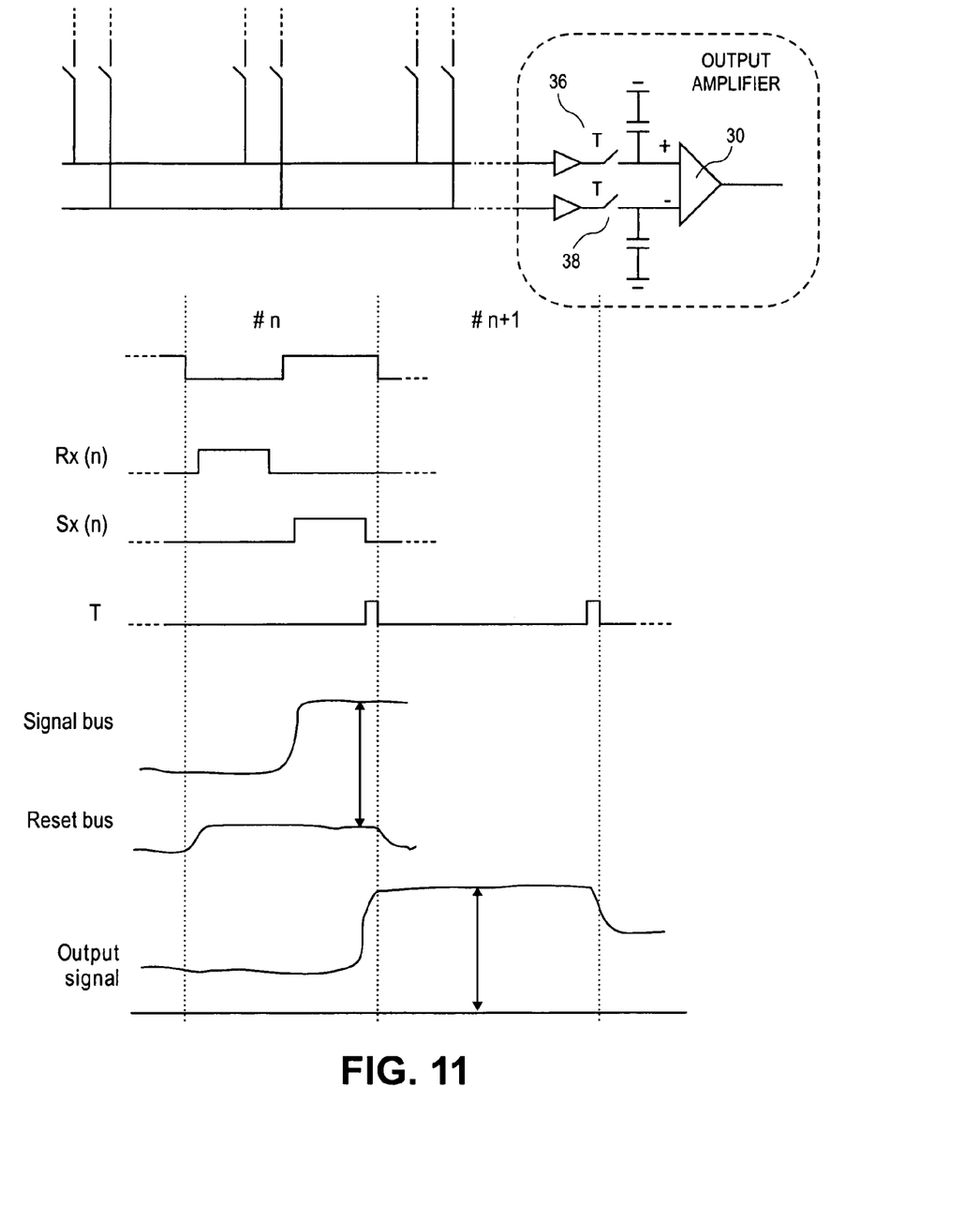
FIG. 11 shows another embodiment of the present invention wherein a single-ended synchronous output is generated and wherein each of the signals must be stable within one half of the pixel period.

Using the above timing scheme, the useful output signal is only available at the end of each pixel period, at the moment when both the R and S signal have been put correctly on the differential readout bus 32, 34. If needed, a synchronization step can be performed in the output amplifier 30. FIG. 11 shows a possible implementation of this step. With an extra track & hold stage 36, 38 on each of the busses 32, 34 of the output amplifier 30, the signal on the busses 32, 34 can be held during the time of the pixel period when the signal is put on the respective bus 32, 34. It is tracked only during the time when the differential signal is valid.

Figure 5:
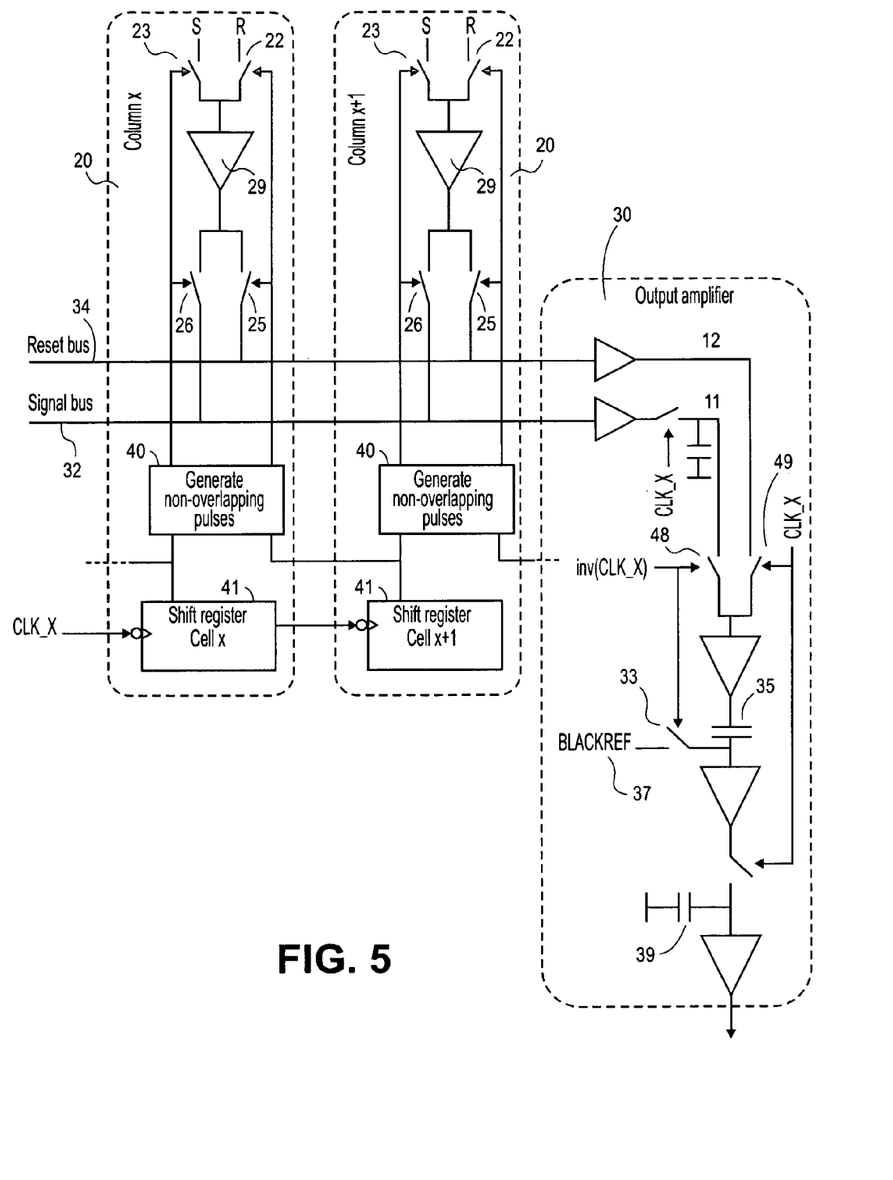
FIG. 5 shows an embodiment of the present invention wherein a single-ended synchronous output is generated and wherein each of the signals on the common output lines must be stable within one complete clock period.
Figure 6:
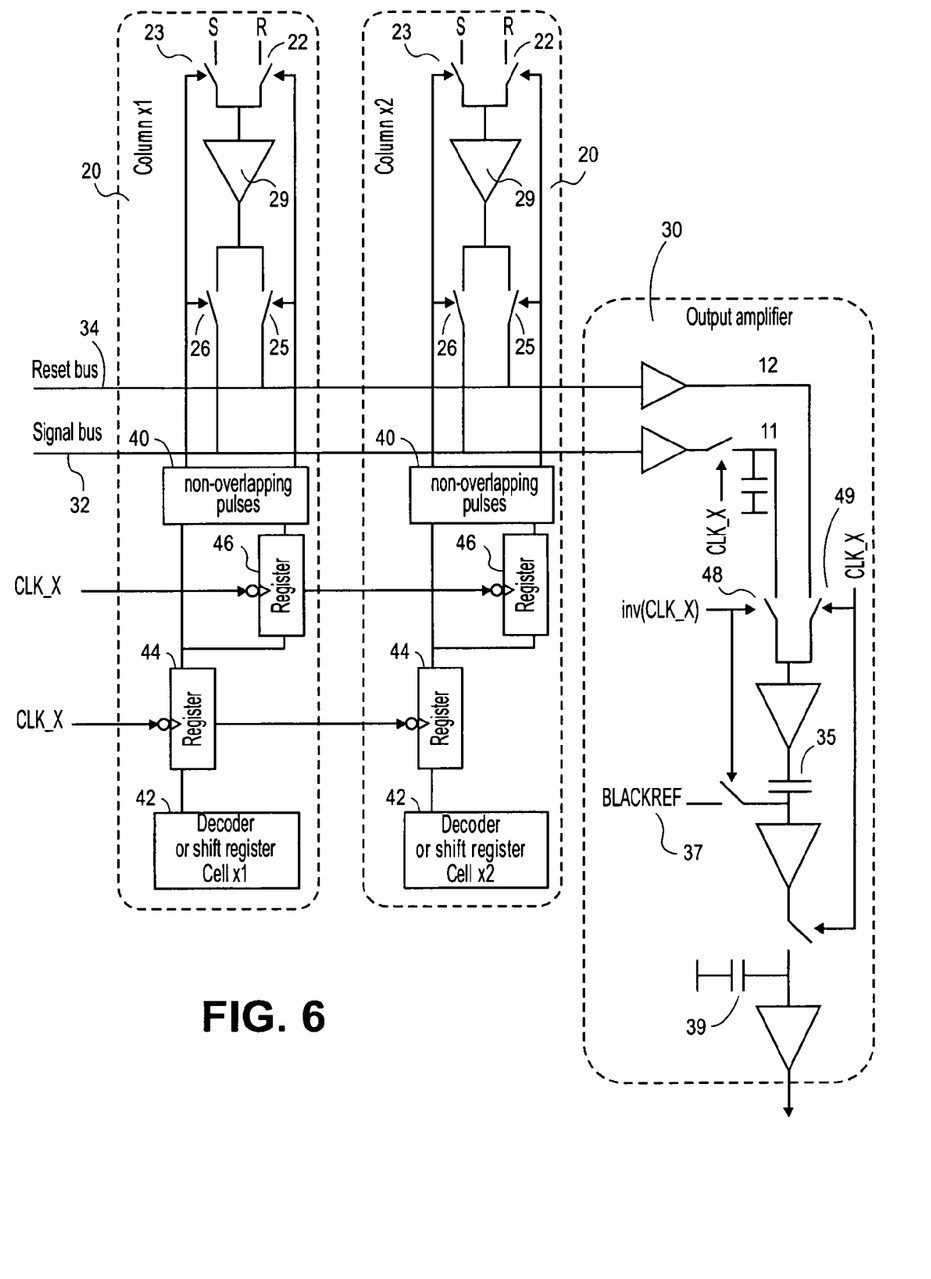
FIG. 6 shows another embodiment of the present invention wherein a single-ended synchronous output is generated and wherein each of the signals on the common output lines must be stable within one complete clock period, and wherein random column access, column sub sampling and windowing is possible.

The embodiments of FIGS. 4 and 11 have the disadvantage that the R and S signals have to be transferred to the readout busses 32, 34 in a time period equal to half the pixel readout period. This will limit the maximal readout speed of the image sensor array. FIGS. 5 and 6 disclose two other independent embodiments of the present invention, wherein the R and S signals can be transferred to their respective reset and select bus 32, 34 during the complete time period. This doubles the maximal readout speed for the same operation conditions.

FIG. 5 discloses an embodiment of the present invention, wherein the output amplifier 30 synchronizes the R and S signal on the reset and select bus 32, 34 and generates a single-ended output signal. Items with the same reference numbers refer to the same items as in FIG. 2. On the falling edge of the pixel clock (CLK_X), a new column is selected by a shift register 41. At this moment, multiplexing of the S-signal of column x and the R signal of column x−1 starts. The S signal of column x which appears on the signal bus 32, is sampled at the output stage on the next falling edge of CLK_X. At this moment, also the R-signal of column x starts to be available on the reset bus 34. This means that at this moment, both the S and R signals of column x are available in the output amplifier 30 on nodes 11 and 12. The output amplifier 30 contains a series-connected capacitor 35, of which one side is clamped to a reference voltage 37 which corresponds to the output level for a dark pixel. Meanwhile, the S signal is fed to the other side of the capacitor 35 via closed switch 48. At the next rising edge of CLK_X, the capacitor 35 is disconnected from the dark reference voltage 37 by a switch 33 and the R signal is applied at the other side of the capacitor 35 via switch 49. At this side, a valid output level starts to appear for a time period being one half of the clock period. This valid signal can be extended for the remainder of the time period by a track and hold circuit 39.

In this embodiment, the R and S signals can be multiplexed on the Reset and Signal busses 34, 32 with a speed equal to the pixel rate. Only the output amplifier 30 has to operate at the double sample rate. This is an optimal situation, because very often, the large capacitance of the common readout busses 32, 34 limits high-speed multiplexing. Inside the output amplifier 30, the load capacitances are lower. The optimal capacitance values for the series-connected capacitor 35 and the sample capacitors of both track & hold circuits 36, 38 are ½ of the capacitance of each bus, but with a minimal value of 2 pF to limit kTC noise.

FIG. 6 shows another embodiment of the present invention. Items with the same reference numbers refer to the same items as in FIG. 2. This structure enables random access to the columns, or sub-sampling of columns. The output of a column decoder or complex shift register 42 is first sampled by registers 44, 46 that freeze their input on the falling clock edge. After a falling edge on CLK_X, the S signal of column x1 starts being transferred to the Signal bus 34. After the next falling edge on CLK_X, the R signal of column x1 starts being transferred to the Reset bus 32. The readout mechanism of the output amplifier 30 is similar to the structure of FIG. 5.

Figure 7:
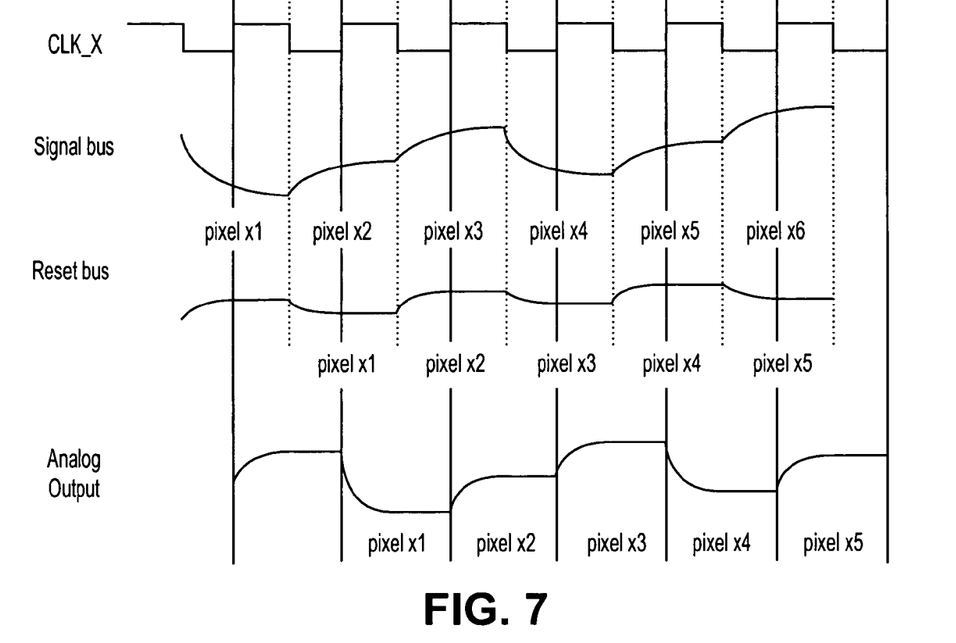
FIG. 7 schematically shows a column readout timing diagram and signal levels on the common output lines and the single-ended output for the embodiments of FIGS. 5 and 6.

FIG. 7 shows the timing diagram and the waveforms on the Signal and Reset bus and at the output of the output amplifier 30 for the implementations of FIGS. 5 and 6.

Figure 8:
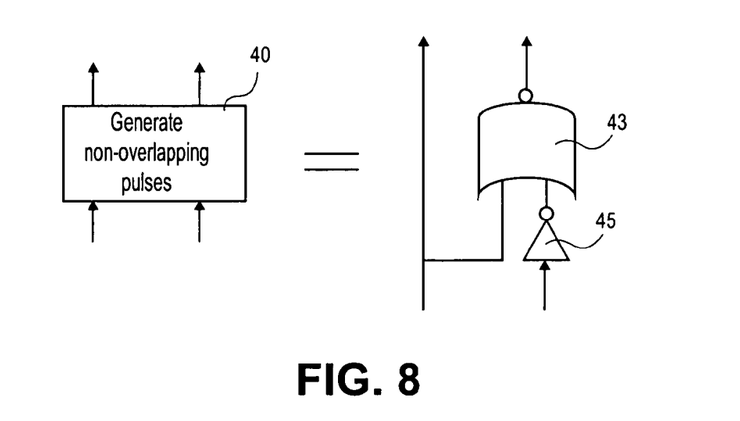
FIG. 8 shows an embodiment of the circuit for generation of non-overlapping pulses used in the embodiment of FIGS. 5 and 6.

For all of the above embodiments of the present invention, the pulses used to connect the R or S signal stored inside the column amplifiers 20 to the amplifying element 29 inside each column preferably do not overlap at all. Otherwise, charges of the S and R signal will be mixed resulting in loss of the signal. In order to overcome this problem, a circuit 40 for generation of non-overlapping pulses can be implemented. FIG. 8 shows an example of such a circuit. It is has two inputs and two outputs and is composed of a NOR gate and an inverter 45. It may be employed in the embodiment of FIG. 5 between the shift register 41 and the control terminals of the switches 22, 23 of the amplifying circuit 20. Alternatively it may be used in the embodiment of FIG. 6 between the registers 44, 46 and the control terminals of the switches 22, 23 of the amplifying circuit 20.

Figure 12A:
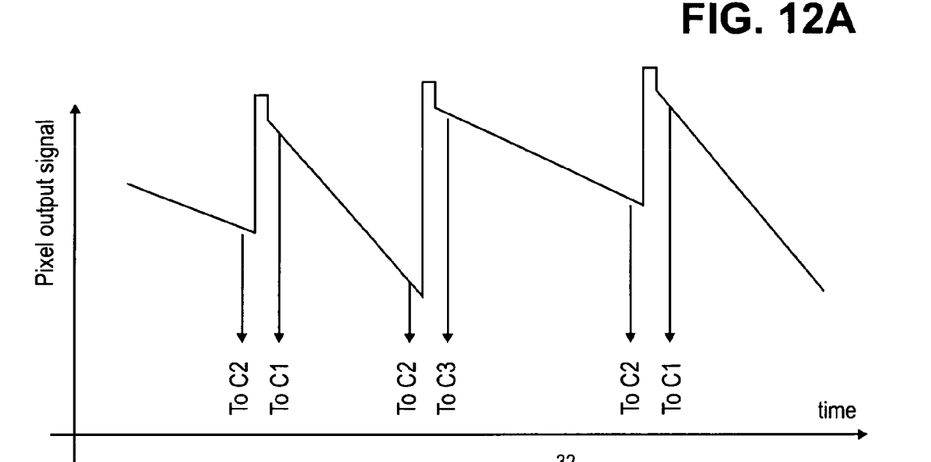
FIG. 12 shows another embodiment of the present invention wherein a pixel signal is sampled at the start and at the end of the integration period, hereby offering a readout mode free of kTC-noise.
Figure 12B:
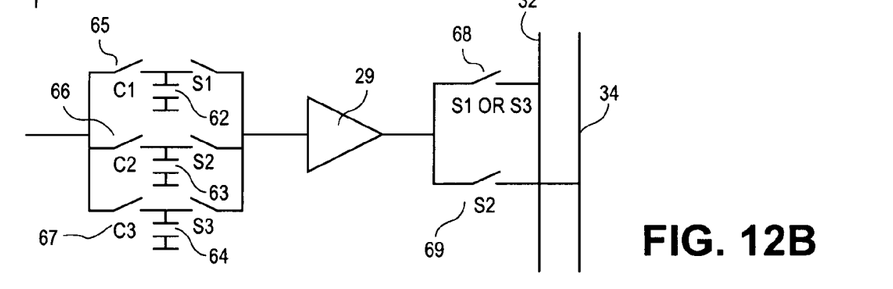
Figure 12C:
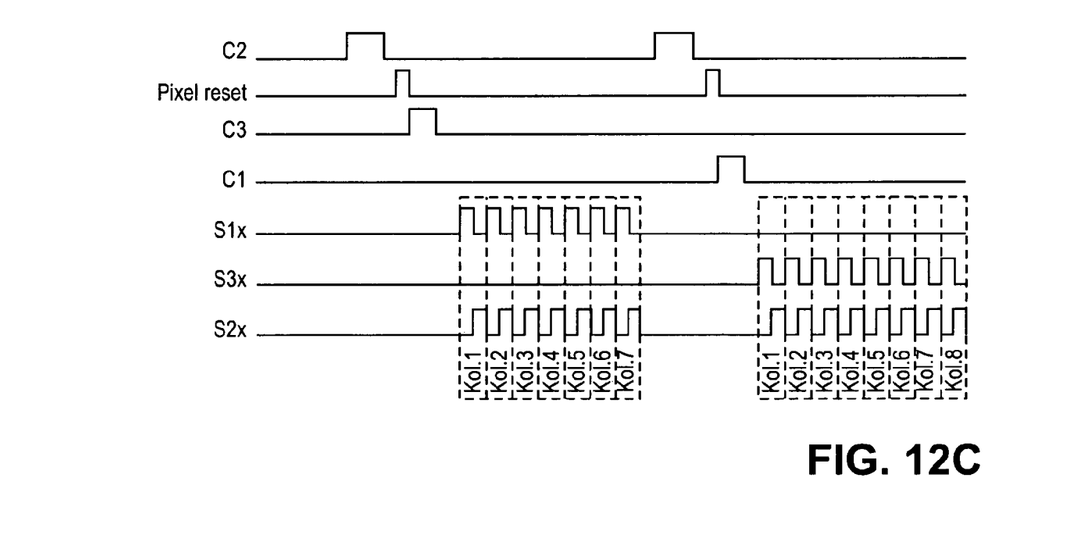

FIG. 12 shows another embodiment of the present invention, where the circuit can be used to cancel kTC noise generated during pixel reset. It assumes that the same row of pixels is read out several times, like in (but not limited to) the case of a linear image sensor. With reference to FIG. 12B, the signal after pixel reset is sampled on one capacitor 62 by closing a switch 65. After integration of the photo-generated charges, the signal is sampled on a second capacitor 63 by closing switch 66 and opening switch 65. During the next integration cycle of the photogenerated charges, the difference between both samples is read out by closing switches S1 and S2. However, in order to read out also this next integration cycle, also the pixel signal after reset needs to be sampled. This is done by sampling that signal on a third capacitor 64 by closing switch 67 while keeping switches 66 and 65 open. The sampling of the reset level alternates between capacitor C1 (62) and C3 (64). This readout method cancels kTC noise generated during pixel reset, because the signal after integration of photocharges is compared to the reset level of the same integration cycle.

Figure 13:
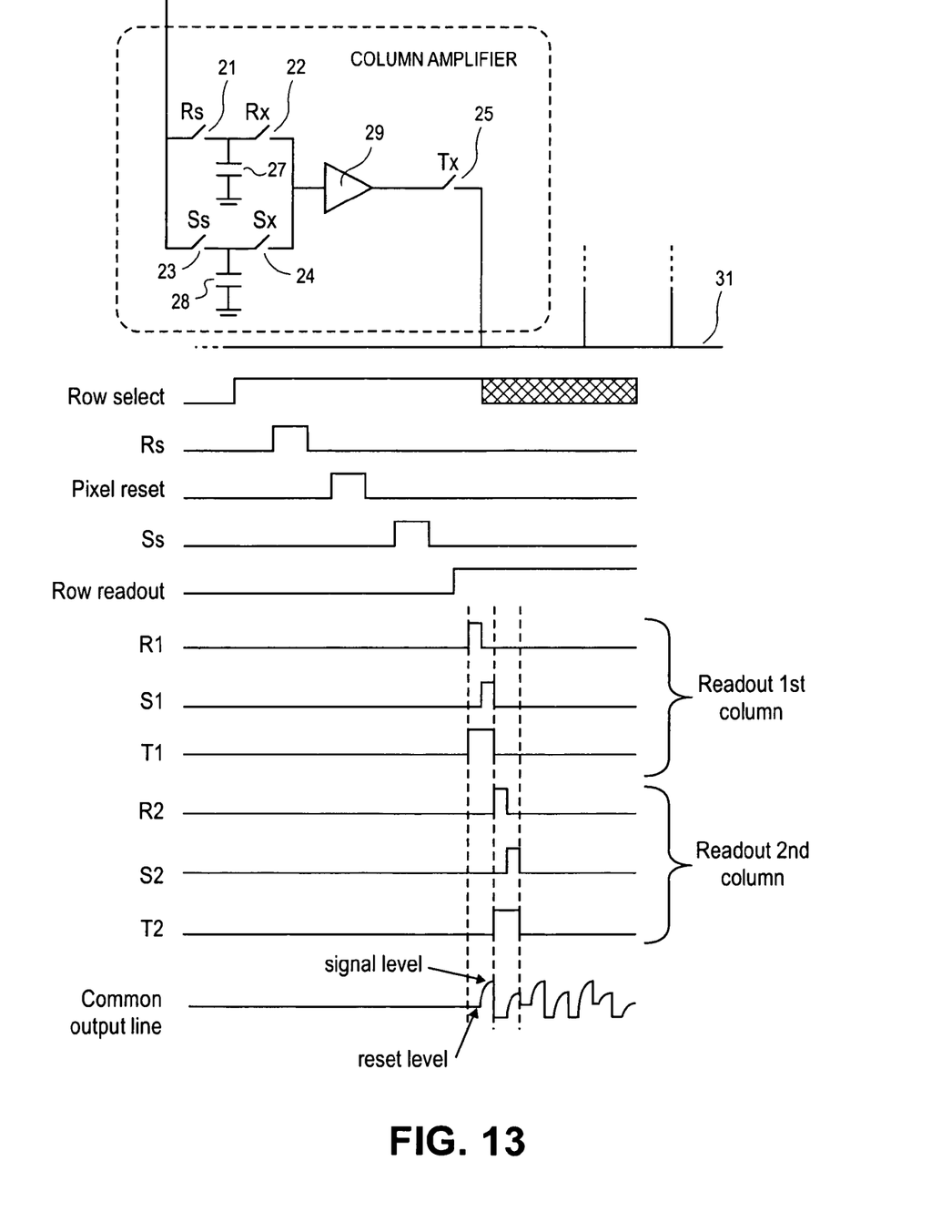
FIG. 13 shows another embodiment of the present invention with only one common output line and a CCD-like sensor output.

FIG. 13 shows another embodiment of the present invention, where only one common readout bus 31 is used. The R and S signals of each column are multiplexed consecutively on this bus 31 using the switches 22, 24 and 25. The advantage of this method is that the output is similar to the output of a Charge-Coupled Device. It can be advantageous in systems where a CMOS active pixel sensor has to replace a CCD that was in use before. However, the disadvantage of this method is that the multiplexing speed of the R and S signals is double compared to the pixel rate. Also, large signal swings appear on the common readout bus 31, making multiplexing even harder.

In any of the above embodiments the amplifying element 29 used in the column amplifiers 20 can be a simple transistor, e.g. in source follower configuration, or a more complex amplifier on its own, like but not limited to an operational transconductance amplifier. If this amplifier 29 can be switched off, the image sensor can be designed for low power dissipation. The amplifier 29 is only switched on when the actual column is read out, which means that only one or two column amplifiers are active at the same time on the entire chip. The amplifiers can also be designed for low power supply voltages, which means that the circuit can still be used in advanced deep sub-micron technologies.

Advantages of the present invention are:

1) The signal path is fully differential. Electrical crosstalk and power supply variations are common mode effects that influence both the R and S signals in the same way. They will not disturb the output signal. This is especially important for high speed and system-on-a-chip circuits (like the 'camera-on-a-chip'). If desired, a differential analog chip output can be produced or the differential output signal of the image sensor can be fed directly to an on-chip processing circuit, like (but not limited to) an analog-digital converter.

2) The amplifying element 29 in the columns can be designed for low supply voltages. In this way, the circuit can work for future deep sub-micron technologies with low power supply voltages.

3) The amplifying element 29 can be designed with the desired gain value (e.g. unity gain). E.g. an operational transconductance amplifier (OTA) can be used. A source follower, which is often used in other approaches, has a higher attenuation of the signal.

4) The amplifying element 29 can be designed so that it can be switched off. This makes it possible to design image sensors with very low power consumption. The column amplifier is powered on only when it is used, namely during the readout of the column.

5) The column amplifiers 29 require a simple and straightforward timing (one pulse for 'R' and one for 'S'). The pulses for 'Rs' and 'Ss' can be generated locally in the amplifier, from the signals of the pixel clock and the X shift register.

6) Only one column amplifier 29 is needed instead of two that are necessary with the approach of FIGS. 9 and 10.

7) The output signal is free of pixel and column offset variations.

8) No reference voltages are needed for the column amplifiers 29.

9) Multiplexing of the R and S signals on the respective output busses can be implemented at the same speed as the pixel rate. There is no need for a double-speed R and S multiplexing.

10) The amplifying element 29 can be designed to have a symmetrical rise and fall time at its output (like a well-designed operational transconductance amplifier).

While the invention has been shown and described with reference to preferred embodiments, it will be understood by those skilled in the art that various changes or modifications in form and detail may be made without departing from the scope and spirit of this invention.

What is claimed is:

1. An amplifying circuit, comprising:
   an amplifying element with at least an input terminal and an output terminal;
   a signal input node, the signal levels of which at least two moments in time are to be amplified by the amplifying element;
   at least two connecting lines between the signal input node and the amplifying element, for transferring a signal from the signal input node to the input terminal of the amplifying element;
   a memory element on at least one of the connecting lines, for storing a signal level of the signal input node at a moment in time;
   an input switching element disposed one each connecting line, between the memory element and the input terminal of the amplifying element if a memory element is provided on the connecting line, for consecutively connecting signal levels of the signal input node at different moments in time to the same amplifying element;
   a first output switching element coupled to the output terminal of the amplifying element;
   a second output switching element coupled to the output terminal of the amplifying element without connection through the first output switching element;
   a first readout bus coupled to the first output switching element;
   a second readout bus coupled to the second output switching element; and
   an output amplifier coupled to the first and second readout buses.

2. The amplifying circuit according to claim 1, further comprising a memory element on each of the connecting lines.

3. The amplifying circuit according to claim 1, wherein the amplifying element is a transistor of the type of metal oxide semiconductor transistors.

4. The amplifying circuit according to claim 1, wherein the amplifying element is an operational transconductance amplifier.

5. The amplifying circuit according to claim 1, wherein the memory element is a capacitor.

6. The amplifying circuit according to claim 1, wherein the first readout bus is a signal bus and the second readout bus is a reset bus.

7. The amplifying circuit according to claim 6, wherein the output amplifier has a positive input and a negative input and wherein the signal bus is coupled to the positive input and the reset bus is coupled to the negative input.

8. The amplifying circuit according to claim 1, wherein a differential signal on the first and second readout buses is proportional to the signal levels of the signal input node.

9. An array of amplifying circuits, each amplifying circuit, comprising:
   an amplifying element with at least an input terminal and an output terminal;
   a signal input node, the signal levels of which at least two moments in time are to be amplified by the amplifying element;
   at least two connecting lines between the signal input node and the amplifying element, for transferring a signal from the signal input node to the input terminal of the amplifying element;
   a memory element on at least one of the connecting lines, for storing a signal level of the signal input node at a moment in time;
   a switching element disposed on each connecting line, between the memory element and the input terminal of the amplifying element if a memory element is provided on the connecting line, for consecutively connecting signal levels of the signal input node at different moments in time to the same amplifying element;
   a first output switching element coupled to the output terminal of the amplifying element;
   a second output switching element coupled to the output terminal of the amplifying element without connection through the first output switching element;
   a first readout bus coupled to the first output switching element;
   a second readout bus coupled to the second output switching element; and
   an output amplifier coupled to the first and second readout buses, wherein the first and second readout buses are coupled to each of the array of amplifying circuits.

10. A device for imaging applications, comprising:
    a matrix of active pixels arranged in a geometric configuration, each pixel producing an electrical signal indicative of the light intensity of a portion of a scene being imaged by that pixel;
    at least one amplifying circuit common to a group of pixels out of the matrix,
    wherein each amplifying circuit comprises:
      an amplifying element with at least an input terminal and an output terminal;
      a signal input node being intended to obtain electrical signals from pixels out of the group of pixels to which the amplifying circuit is common, the signal levels of which are to be amplified by the amplifying element;

at least two connecting lines between the signal input node and the amplifying element, for transferring an electrical signal from the signal input node to the input terminal of the amplifying element;

a memory element on at least one of the connecting lines, for storing a signal level of the electrical signal at the signal input node at a moment in time;

a switching element disposed on each connecting line, between the memory element and the input terminal of the amplifying element if a memory element is provided on the connecting line, for consecutively connecting signal levels of the electrical signals at the signal input node at different moments in time to the same amplifying element;

a first output switching element coupled to the output terminal of the amplifying element;

a second output switching element coupled to the output terminal of the amplifying element;

a first readout bus coupled to the first output switching element;

a second readout bus coupled to the second output switching element without connection through the first output switching element; and an output amplifier coupled to the first and second readout buses, wherein the first and second readout buses are coupled to each amplifying circuit.

11. The device according to claim 10, wherein the matrix is arranged in columns and rows and wherein the group of pixels is a row of pixels.

12. The device according to claim 10, wherein the matrix is arranged in columns and rows and wherein the group of pixels is a column of pixels.

13. The device according to claim 10, wherein the first and second readout buses are common to the matrix of active pixels.

14. A method for reducing fixed pattern noise of solid state imaging device having a group of active pixels, each pixel comprising a radiation sensitive element and an amplifying circuit, the method comprising:

reading out the signal of a pixel brought in a first state and storing the corresponding voltage level in a first memory element;

reading out the signal of the pixel brought in a second state, which is different from the first state, and storing the corresponding voltage level in a second memory element;

transferring the signal of the first memory element to an amplifying element, amplifying the signal of the first memory element, and transferring the amplified signal of the first memory element to a first readout bus;

transferring the signal of the second memory element to the same amplifying element, amplifying the signal of the first memory element, and transferring the amplified signal of the second memory element to a second readout bus in parallel with the transfer to the amplified signal of the first memory element to the first readout bus; and repeating these steps for at least part of the pixels of the imaging device.

15. The method according to claim 14, further comprising calculating a differential output signal by taking the difference between potential values on the first and second readout buses.

16. The method according to claim 14, wherein the first state and the second state correspond to different amounts of radiation collected on the radiation sensitive element in the pixel.

17. The method according to claim 16, wherein the first state or the second state corresponds to an amount of radiation or light collected on the radiation sensitive element in the pixel.

18. The method according to claim 16, wherein the second state or the first state corresponds to a non-irradiated or non-illuminated or dark or reset state or the first state corresponds to a non-irradiated or non-illuminated or dark or reset state of the pixel.

19. The method according to claim 14, wherein the pixel is read out in additional states and its corresponding voltage level is being stored on additional memory elements.

20. The method according to claim 14, wherein the signal of the first memory element is transferred to the first output line common for the group, and concurrently, the signal of the second memory element of another amplifier is transferred to the second output line common for said group.

* * * * *